Patented Apr. 22, 1952

2,594,269

UNITED STATES PATENT OFFICE 2,594,269

PROCESS FOR THE PURIFICATION OF CARBON DIOXIDE

Wilhelm Geisel, Ludwigshafen-on-the-Rhine, Germany

No Drawing. Application October 1, 1949, Serial No. 119,215. In France June 27, 1947

5 Claims. (Cl. 23—150)

This invention relates to the manufacture of urea by the interaction of carbon dioxide and ammonia.

In the production of urea from carbon dioxide and ammonia, the materials used in the construction of the apparatus, as it is known, are liable to undergo corrosion under the action of the reaction participants and, more specifically, under the action of certain contaminants contained in the initial gases. It has been known in the art for some time that the durability of the installations used in urea production may be increased by avoiding the presence of oxygen in the reaction gases. I have recently found that the initial gases, prior to being converted into urea, should also be carefully freed from sulfur compounds, i. e. of inorganic sulfur compounds, such as hydrogen sulfide, and of organic sulfur compounds, in particular of carbon oxysulfide.

I have now found, and this is the object of my present invention that the minute amounts of carbon monoxide with which carbon dioxide is usually intermixed, likewise exert a deleterious action upon the installations used in the production of urea. This action closely resembles that of oxygen and sulfur compounds. I have further found that the durability of the materials used in the construction of the apparatus required, even if these are chemically resistant, may be appreciably increased by carefully freeing the gases participating in the reaction from carbon monoxide. The injurious effect of carbon monoxide may not have been apparent to those skilled in the art since carbon monoxide alone, i. e. in the absence of carbon dioxide and ammonia, practically fails to attack copper-nickel alloys conventionally used for urea plant installations. However, when ammonium carbamate is converted into urea in a pressure-tight vessel made from any such alloy, under carbon monoxide pressures ranging from 10 to 30 atmospheres, the alloy is attacked to the extent that the urea formed contains some tenths of a per cent of either copper or nickel. By contrast, when the urea is produced in the absence of carbon monoxide, under otherwise equal conditions, it contains but few hundredths of a per cent of any of these metals.

Generally speaking, my invention consists in removing carbon monoxide from gaseous carbon dioxide to be used in the urea synthesis subsequent to purifying this carbon dioxide from sulfur compounds and if necessary from oxygen. Oxygen will automatically be removed by its reaction with hydrogen, a regular partner of carbon dioxide manufacture from water-gas. The purification of carbon dioxide from sulfur compounds which constitutes the first step of my invention may be performed in any of the conventional manners. It is preferably performed according to one of the methods which form the object of my co-pending application Ser. No. 119,213 and the now abandoned application Ser. No. 119,214, each filed October 1, 1949 (Process of Purifying Gaseous Carbon Dioxide—Improvements in the Production of Urea From Carbon Dioxide and Ammonia). In the first step of my invention gaseous carbon dioxide after having been freed from hydrogen sulfide in the conventional manner, e. g. by treatment with active carbon, at moderately elevated temperature in the presence of additional oxygen and some ammonia, is passed, still in the presence of oxygen, over active carbon, preferably made from mineral coal according to U. S. Patent No. 1,582,718, under the pressure required for the urea synthesis and at a temperature above the critical temperature of carbon dioxide. This treatment results in the removal of organic sulfur compounds. The gas may then be passed over masses capable of combining with sulfur, preferably copper and nickel containing masses, at elevated temperature, in the presence of moisture. This treatment results in the removal of any remnants of organic sulfur compounds and eventually of oxygen. In the last step carbon monoxide contained in the gas as is removed by catalytically oxidizing it to carbon dioxide. This oxidation step may be carried out most advantageously in the presence of the conventional catalysts of the manganese and copper containing type. Should the carbon dioxide have been freed not only from the sulfur compounds but from its oxygen content as well in the first step, oxygen has to be again supplied to carry out the oxidation of the carbon monoxide.

I have found that I may dispose entirely of this addition of oxygen which could constitute a somewhat complex operation in view of the high pressure under which the gas is processed, preferably of at least 100 atmospheres. According to this preferred embodiment of my invention, the residual portions of organic sulfur compounds are removed by passing the carbon dioxide over copper-nickel containing masses at such moderate temperatures that the organic sulfur compounds are completely removed on the one hand, but no appreciable reaction between oxygen and hydrogen will occur on the other hand. In general, temperatures not exceeding about 110° C. will do. When operating at such moderate temperatures, the oxygen remains substantially unchanged and is available for the subsequent removal of carbon monoxide by combining therewith oxygen to form carbon dioxide. Oxygen may be added in sufficient quantities at the very outset of my process so that both the carbon monoxide and the said admixtures of hydrogen are oxidized in this last purification step by the action of the manganese-copper catalysts. Hence, no injury to the apparatus need henceforth be feared from hydrogen either. At a temperature ranging from about 150° to 170° C., these manganese-copper catalysts are apt to bring about a fairly complete oxidation of carbon monoxide and hydrogen.

The following example serves to illustrate the nature of my invention, but it is not intended to restrict it thereto.

*Example*

Through a high-pressure tube having 1 cubic meter of capacity which is charged with about 500 kilograms of an active carbon prepared from mineral coal according to the process described in U. S. Patent No. 1,582,718, there is passed, at 40° C., under a pressure of 150 atmospheres, a gas previously freed from inorganic sulfur compounds, which contains 98.5 per cent of carbon dioxide. The gas flows at a rate of 2,700 kilograms per hour, this quantity containing 0.120 kilogram of organic sulfur compounds; 2.7 kg. of water, 7.69 kilograms of oxygen; 2.65 kilograms of carbon monoxide; 0.765 kilogram of hydrogen and 3.75 kilograms of nitrogen. When leaving the tube, the gas only contains 0.006 kilogram of organic sulfur compounds per hour.

The gas is then heated to 110° C. and passed through a second high-pressure tube of equal capacity which is charged with 500 kilograms of a catalyst prepared by spraying 2000 liters of pumice stone with a solution of 100 kg. of nickel and 10 kg. of copper in 700 kg. of 40 per cent nitric acid and heating the pumice stone so treated to 300° C. in a current of hot air. On leaving this tube, the gas contains no more organic sulfur compounds.

In a third purification step the gas is heated to 170° C. and passed through an equal-sized third high-pressure tube charged with 500 kilograms of an oxidation catalyst consisting of oxides of manganese and copper. The gas issuing from the tube contains no more carbon monoxide and oxygen. It does not contain any appreciable amounts of hydrogen either.

Without releasing the pressure of 150 atmospheres, the gas is now caused to react with ammonia in the conventional manner for the production of urea.

I claim:

1. In a process of purifying substantially pure gaseous carbon dioxide containing a minor amount of carbon oxysulfide and carbon monoxide as contaminants to obtain a pure carbon dioxide especially suitable for the production of urea from carbon dioxide and ammonia, the steps which comprise passing said contaminated carbon dioxide together with enough oxygen, under non-alkaline conditions, to decompose in a first stage the carbon oxysulfide into carbon dioxide and free sulfur and in a second stage to oxidize the carbon monoxide into carbon dioxide, under pressure of at least 100 atmospheres and at a temperature not below the critical temperature of carbon dioxide, through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced, then removing the last traces of the carbon oxysulfide and at the same time to avoid oxidation of any hydrogen present by passing the substantially desulfurized gas under pressure, in the presence of moisture, through a bed of masses which contain copper and nickel, said masses being capable of removing the last traces of the sulfur at an elevated temperature, maintained at a temperature of about 110° C., and then catalytically oxidizing the carbon monoxide in the completely desulfurized gaseous carbon dioxide by passing said gas through a bed of oxides of manganese and copper at temperatures of between 150° C. and 170° C.

2. In a process of purifying substantially pure gaseous carbon dioxide containing a minor amount of carbon oxysulfide and carbon monoxide as contaminants to obtain a pure carbon dioxide especially suitable for the production of urea from carbon dioxide and ammonia, the steps which comprise passing said contaminated carbon dioxide together with enough oxygen, under non-alkaline conditions, to decompose in a first stage the carbon oxysulfide into carbon dioxide and free sulfur and in a second stage to oxidize the carbon monoxide into carbon dioxide, under a pressure of about 150 atmospheres and at a temperature of about 40° C. through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced, then removing the last traces of the carbon oxysulfide and at the same time to avoid oxidation of any hydrogen present by passing the substantially desulfurized gas, under pressure, in the presence of moisture through a bed of masses which contain copper and nickel, said masses being capable of removing the last traces of the sulfur at an elevated temperature, maintained at a temperature of about 110° C., and then catalytically oxidizing the carbon monoxide in the completely desulfurized gaseous carbon dioxide by passing said gas through a bed of oxides of manganese and copper on an inert carrier at temperatures of between 150° C. and 170° C.

3. In a process of purifying substantially pure gaseous carbon dioxide containing a minor amount of carbon oxysulfide and carbon monoxide as contaminants to obtain a pure carbon dioxide especially suitable for the production of urea from carbon dioxide and ammonia, the steps which comprise passing said contaminated carbon dioxide together with enough oxygen, under non-alkaline conditions, to decompose in a first stage the carbon oxysulfide into carbon dioxide and free sulfur and in a second stage to oxidize the carbon monoxide into carbon dioxide, under increased pressure of at least 100 atmospheres and at a temperature not below the critical temperature of carbon dioxide through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced, then removing the last traces of the carbon oxysulfide and at the same time to avoid oxidation of any hydrogen present by passing the substantially desulfurized gas, under pressure, in the presence of moisture through a bed of masses which contain copper and nickel at a temperature of about 110° C. said masses being capable of removing the last traces of sulfur at an elevated temperature, and then catalytically oxidizing the carbon monoxide in the completely desulfurized gaseous carbon dioxide by passing said gas through a bed of oxides of manganese and copper on an inert carrier at temperatures of between 150° C. and 170° C.

4. In a process of purifying substantially pure gaseous carbon dioxide containing a minor amount of carbon oxysulfide and carbon monoxide as contaminants to obtain a pure carbon dioxide especially suitable for the production of urea from carbon dioxide and ammonia, the steps which comprise passing said contaminated carbon dioxide together with enough oxygen, under non-alkaline conditions, to decompose in a first stage the carbon oxysulfide into carbon dioxide and free sulfur and in a second stage to oxidize the carbon monoxide into carbon dioxide, under a pressure of about 150 atmospheres and at a temperature not below the critical temperature of carbon dioxide through a bed of activated carbon, said activated carbon having been prepared by treating mineral coal in a shaft furnace with hot combustion gases which are blown through the coal with sufficient pressure to establish a strong agitation of the coal, until the amount of the carbon oxysulfide is substantially entirely reduced, then removing the last trace of the carbon oxysulfide and at the same time to avoid oxidation of any hydrogen present by passing the substantially desulfurized gas, under pressure, in the presence of moisture through a bed of masses which contain copper and nickel at a temperature not exceeding about 110° C. said masses being capable of removing the last traces of sulfur at an elevated temperature, and then catalytically oxidizing the carbon monoxide in the completely desulfurized gaseous carbon dioxide by passing said gas through a bed of oxides of manganese and copper on an inert carrier at temperatures of between 150° C. and 170° C.

5. In a process of purifying substantially pure gaseous carbon dioxide containing a minor amount of carbon oxysulfide and carbon monoxide as contaminants to obtain a pure carbon dioxide especially suitable for the production of urea from carbon dioxide and ammonia, the steps which comprise passing said contaminated carbon dioxide together with enough oxygen, under non-alkaline conditions, to decompose in a first stage the carbon oxysulfide into carbon dioxide and free sulfur and in a second stage to oxidize the carbon monoxide into carbon dioxide, under increased pressure of at least 100 atmospheres, and at a temperature not below the critical temperature of carbon dioxide through a bed of activated carbon, until the amount of the carbon oxysulfide is substantially entirely reduced, then removing the last trace of the carbon oxysulfide and at the same time to avoid oxidation of any hydrogen present by passing the substantially desulfurized gas under pressure, in the presence of moisture through a bed of masses which contain copper and nickel, said masses being capable of removing the last traces of the sulfur at an elevated temperature, maintained at a temperature not exceeding 110° C., and then catalytically oxidizing the carbon monoxide in the completely desulfurized gaseous carbon dioxide by passing said gas through a bed of oxides of manganese and copper at temperatures of between 150° C. and 170° C.

WILHELM GEISEL.

REFERENCES CITED

The following references are of record in the file of this patent:

UNITED STATES PATENTS

| Number | Name | Date |
| --- | --- | --- |
| 1,730,208 | Hetherington et al. | Oct. 1, 1929 |
| 1,895,724 | Miller | Jan. 31, 1933 |
| 1,900,751 | Baehr | Mar. 7, 1933 |
| 1,919,626 | Finn | July 25, 1933 |
| 1,945,407 | Adair et al. | Jan. 30, 1934 |
| 1,968,899 | Nathan | Aug. 7, 1934 |
| 1,995,274 | Eversole | Mar. 19, 1935 |
| 2,037,685 | Holden | Apr. 14, 1936 |
| 2,074,311 | Moore | Mar. 16, 1937 |
| 2,110,240 | Roelen | Mar. 8, 1938 |
| 2,149,039 | Benning | Feb. 28, 1939 |
| 2,168,933 | Giller | Aug. 8, 1939 |